UNITED STATES PATENT OFFICE.

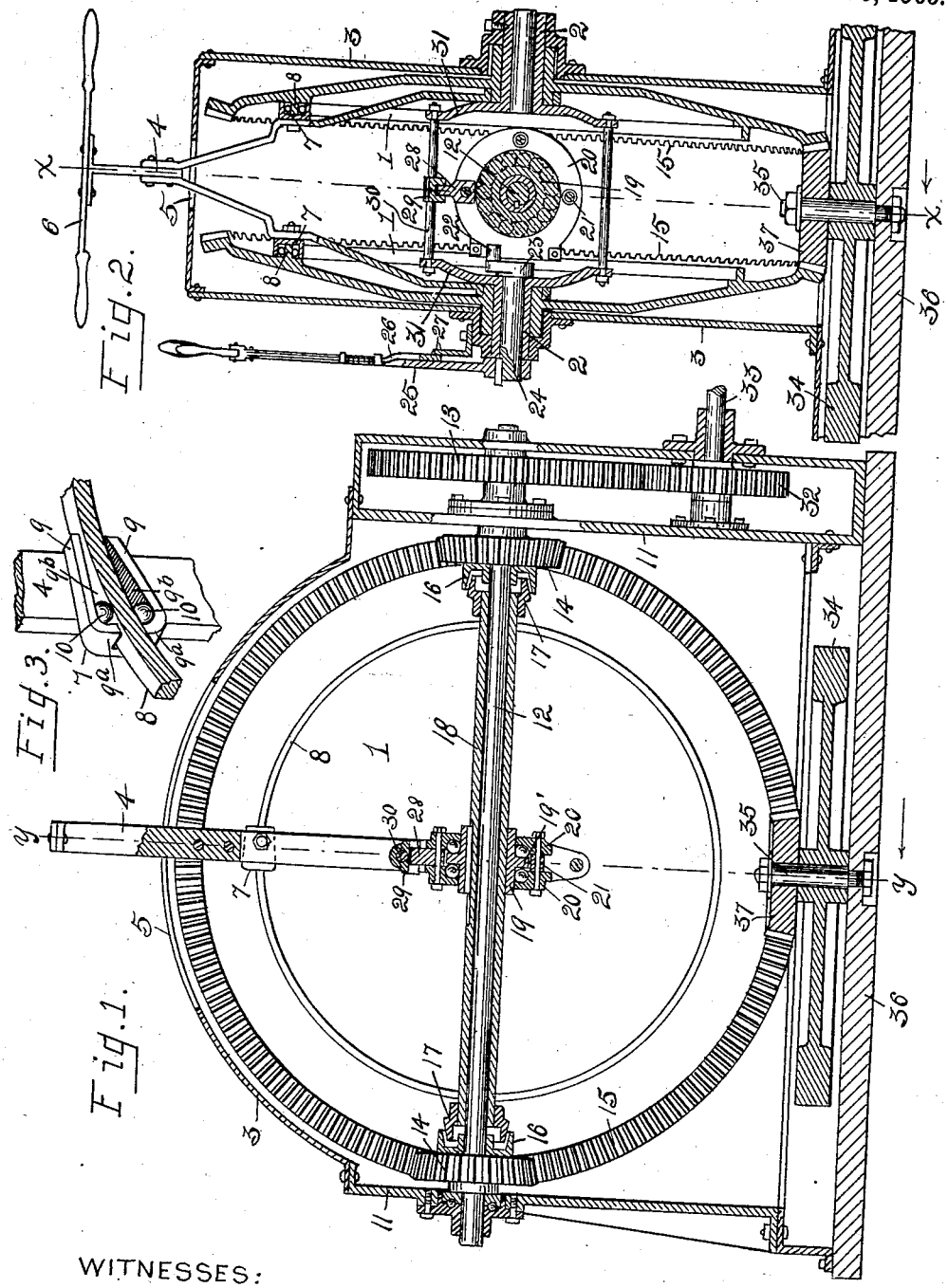

ROBERT DIAMOND MAYO, OF ERIE, PENNSYLVANIA.

POWER-TRANSMISSION MECHANISM.

No. 914,740. Specification of Letters Patent. Patented March 9, 1909.

Application filed December 23, 1907. Serial No. 407,820.

*To all whom it may concern:*

Be it known that I, ROBERT DIAMOND MAYO, a citizen of the United States, and a resident of Erie, in the county of Erie and State of Pennsylvania, have invented a certain new and useful Power - Transmission Mechanism; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to mechanisms for the transmission of power, and particularly to the class of such mechanisms employed to convert a reciprocatory movement into a continuous rotary movement and adapted to be used in small boats and manually operated to propel the same.

The object of my invention is to simplify and improve upon the construction and operation of the power-transmitting mechanism shown and described in the United States application filed by me on April 3, 1907, being Serial No. 366,098, whereby to materially enhance the practicability and commercial value thereof.

The operation, construction and arrangement of the parts of the invention are fully described in the following specification, and illustrated in the accompanying drawings, in which,—

Figure 1 is a central vertical longitudinal section on the dotted line $x\ x$ in Fig. 2 of the mechanism embodying the features of my invention, with the clutch-sleeve in neutral position. Fig. 2 is a central vertical transverse-section on the dotted line $y\ y$ in Fig. 1, and Fig. 3 is an enlarged perspective view of a portion of the operating lever, its clutch or gear-flange engaging member, and a portion of the engaged flange.

Referring to the drawings, 1, 1 designate two large laterally spaced bevel-gears, which are loosely mounted on the inner or contiguous ends of the two axially spaced stationary stub-shafts 2, 2, which pass outwardly through the contiguous sides of the housing 3, being fixedly secured in suitable bearings provided therein, as shown.

Rising from between the two gears 1, 1 with its inner end forked and each furcation thereof fulcrumed to a shaft 2 or to the inner hub-end of the associated gear, as shown, or in any other suitable manner, is the operating-lever 4, which has its upper end working through an elongated slot 5 in the housing top and provided with the handle-bar 6. A clutch or gripping-member 7 is pivotally carried by each fork-arm of the lever for engagement with the annular coaxial flanges 8, 8, formed on the inner faces of the two gears, one clutch-member being intended to grip the flange of its gear in one direction of oscillation of the lever, and the other member to grip the flange of its gear in the other direction of oscillation of the lever, thus causing successive oscillations of the lever to drive the two gears 1, 1 in reverse directions. The clutch-members 7 comprise blocks, which have the upper and lower flanges 9, 9 projecting therefrom above and below the associated gear-flange 8, said block-flanges being close to the gear-flange surfaces at one end, thence inclining gradually away from the flange in the direction of intended rotation of the gear and having their forward ends turned inwardly toward the gear-flange, as shown at $9^a$ to form the wedge-shaped pockets $9^b$ on each side of the gear-flange and in which the friction-balls 10 operate, thus causing the block and balls to coöperate to tightly grip the gear-flange in one direction of movement of the lever and to release the same in the opposite direction of movement of the lever. While this form of clutch forms a very efficient means for gripping a gear-wheel in one direction of movement of the lever, I do not wish to be limited to such construction in connection with the other features of my invention.

Extending between the gear-wheels 1, 1 diametrically thereof with its opposite ends suitably journaled in the stationary frame or housing parts 11 is a horizontal shaft 12, on one end of which without the wheels 1, 1 is keyed a spur-gear 13. A small bevel-pinion 14 is loosely carried by the shaft near each end thereof in position to mesh with and be driven by the opposing annular series of gear-teeth 15 on the inner sides of the gear-wheels 1, 1.

The inner hub portions of the pinions 14 are formed with clutch-parts 16 with which the clutch-parts 17 are adapted to frictionally coöperate, as shown, or in any other suitable manner. The clutch-parts 17 are carried at opposite ends of a sleeve 18, which is feathered to the shaft 12 for limited longitudinal movement thereon, thus adapting it to be positioned at a neutral point, so that neither clutch is in engagement, or moved to engage either clutch-part 16, so that the sleeve and shaft will be driven in the direction of rotation of the engaged pinion.

A collar 19 is fixed to the sleeve 18 centrally of its ends and is formed with a central annular flange 19' on opposite sides of which are mounted the two loose collars 20, 20, which are secured together in spaced relation by bolts or pins passing through spacing blocks 21 therebetween, and if desired may be held from frictional contact with the fixed collar and its flange by ball-bearings, as shown. Projecting between the spaced edges of the collars 20 at one side thereof is a pin 22, which is carried by the short crank-arm or eccentric 23, as shown in Fig. 2. This crank-arm or eccentric is fixed to the inner end of a short shaft 24, which is loosely passed through the contiguous stub-shaft 2, which stub-shaft is made hollow for such purpose, and carries a lever 25 at its outer end. It is thus apparent that an oscillation of the lever 25 from neutral position will rock the shaft 24 and its eccentric or crank-arm 23 and cause the pin 22 to operate on the collars 20 to move the clutch-sleeve 18 into engagement with one or the other of the pinions 14. The lever is provided with a hand-controlled catch-member 26, which engages with notches in a quadrant 27 to lock the lever in adjusted position. The collars 20, 20 are prevented from turning with the collar 19 by a lug 28 projecting upwardly from said loose collars and working in a slot provided transversely in the under side of a block 29, which is carried by the rod or bolt 30. This bolt connects the ends of arms 31, which rise from the inner ends of the stub-shafts 2, as shown. The gear-wheel 13 is shown as meshing with a smaller gear 32, which is carried at one end of a propeller or other shaft 33.

34 designates a balance-wheel, which is mounted beneath the large gear-wheels 1, 1 on a vertical spindle or stub-shaft 35 projecting upwardly from the housing or frame base 36. Fixed to the upper end of the balance-wheel-hub is a pinion 37, which meshes with and is driven by the large gear-wheels 1, 1 in the same manner as the pinions 14, as shown. The balance wheel 34 is continuously driven in one direction during a running of the apparatus, irrespective of the direction of running of the shaft 33, thus obviating any unevenness in the running of the mechanism due to the pauses of the operating-lever as its directions of movement are reversed.

In the operation of my invention it is apparent that an operation of the operating lever will cause the clutch-members 7 carried thereby to alternately engage the flanges 8, 8 on the gear-wheels 1, 1 and impart opposed rotation thereto, which in turn impart rotation to the pinion 38 and its balance wheel and opposed rotation to the pinions 14, 14 loosely carried by the shaft 12. This shaft and the propeller or other shaft 33 to which it is geared may be permitted to remain quiet during a running of the gear-wheels 1, 1 by allowing the clutch-sleeve 18 to stand in neutral position to the pinions 14, or driven in the desired direction by moving the controlling-lever 25 so as to throw the sleeve into engagement with one or the other of the oppositely revolving clutch-members 16, thereby communicating the requisite motion to the shaft 33.

I wish it understood that I do not desire to restrict myself to the details of construction and arrangement of the parts shown and described, as obvious modifications will occur to persons skilled in the art.

Having thus described my invention, what I claim as new and desire to secure by Letters Patent, is,—

1. In a power transmission mechanism, two laterally spaced rotary members, means for driving said members in opposite directions, two rotary parts driven in opposite directions by coaction with said two members, a clutch element movable to engage either of said rotary parts, a shaft disposed axially of the rotary members, a crank carried by one end of said shaft and coacting with the clutch element to move it when the shaft is rocked, and controlling means carried at the other end of the shaft.

2. In a power transmission mechanism, two laterally-spaced rotary members, a hollow axle for one of said members, means for simultaneously driving the members in opposite directions, a shaft disposed between said members, two rotary elements loosely carried by said shaft and engaging both members on opposite sides of their axis whereby said elements are oppositely rotated, a sleeve feathered to the shaft and having its ends adapted for clutch engagement with said elements, a collar part loosely carried by the sleeve, means for preventing relative movement of said part longitudinally of the sleeve, a shaft journaled in said hollow axle, a crank carried at the inner end of the shaft and adapted to coact with said collar part to effect longitudinal movements of the sleeve, and a controller-lever carried at the outer end of said shaft.

3. In a power transmission mechanism, two laterally-spaced rotary wheels, means for driving said wheels in opposite directions, a hollow axle for one of said members, two rotary members driven in opposite directions by coaction with said members, a clutch element movable to engage either of said members, a shaft journaled in the hollow axle, a crank carried by the inner end of the shaft and having a part coacting with the clutch element to move it into engagement with one or the other of the rotary members or into neutral position when the shaft is rocked, a controller-lever carried at the outer end of the shaft, and a balance-wheel continually driven in one direction by said rotary wheels during the running thereof.

In testimony whereof I have hereunto signed my name to this specification in the presence of two subscribing witnesses.

ROBERT DIAMOND MAYO.

Witnesses:
C. W. OWEN,
HAZEL B. HIETT.